United States Patent
Shinoda (10) Patent No.: US 7,426,171 B2
(45) Date of Patent: Sep. 16, 2008

(54) OPTICAL LENS, CONDENSER LENS, OPTICAL PICKUP, AND OPTICAL RECORDING/REPRODUCING APPARATUS

(75) Inventor: Masataka Shinoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 476 days.

(21) Appl. No.: 10/713,014

(22) Filed: Nov. 17, 2003

(65) Prior Publication Data

US 2004/0145996 A1 Jul. 29, 2004

(30) Foreign Application Priority Data

Nov. 18, 2002 (JP) ............................ P2002-333799

(51) Int. Cl.
*G11B 7/135* (2006.01)
(52) U.S. Cl. ............................ 369/112.23; 369/112.24; 369/112.01
(58) Field of Classification Search ............ 369/112.23, 369/112.24, 112.01
See application file for complete search history.

(56) References Cited

U.S. PATENT DOCUMENTS

| | | | | |
|---|---|---|---|---|
| 5,004,307 A | * | 4/1991 | Kino et al. | 359/356 |
| 5,125,750 A | * | 6/1992 | Corle et al. | 359/819 |
| 5,789,750 A | * | 8/1998 | Nuss | 250/338.1 |
| 6,009,064 A | * | 12/1999 | Hajjar | 369/112.24 |
| 6,208,459 B1 | * | 3/2001 | Coon et al. | 359/355 |
| 6,594,086 B1 | * | 7/2003 | Pakdaman et al. | 359/656 |
| 6,683,729 B1 | * | 1/2004 | Schuster | 359/656 |
| 6,762,978 B2 | * | 7/2004 | Mishima et al. | 369/13.32 |
| 2002/0043707 A1 | * | 4/2002 | Kitahata | 257/680 |
| 2002/0057645 A1 | * | 5/2002 | Kishima | 369/275.4 |

FOREIGN PATENT DOCUMENTS

JP    11273126 A   * 10/1999

* cited by examiner

*Primary Examiner*—Wayne Young
*Assistant Examiner*—Linh T Nguyen
(74) *Attorney, Agent, or Firm*—Oblon, Spivak, McClelland, Maier & Neustadt, P.C.

(57) ABSTRACT

Disclosed herein is an optical lens suitable for a near-field optical recording/reproducing system. A condenser lens, optical pickup, and optical recording/reproducing apparatus each using this optical lens are also disclosed. This optical lens is formed from an SiC single crystal having a cubic structure. The condenser lens includes a first optical lens and a second optical lens arranged in this order from an objective surface, and at least the first optical lens is formed from an SiC single crystal having a cubic structure. The optical pickup includes a light source and a condenser lens for converging light emitted from the light source to form a beam spot. This condenser lens has the same configuration as the above. The optical recording/reproducing apparatus includes this optical pickup.

10 Claims, 6 Drawing Sheets

OPTICAL LENS, CONDENSER LENS, OPTICAL PICKUP, AND OPTICAL RECORDING/REPRODUCING APPARATUS

BACKGROUND OF THE INVENTION

The present invention relates generally to an optical lens, a condenser lens composed of a plurality of optical lens including this optical lens, an optical pickup including this condenser lens, and an optical recording/reproducing apparatus (inclusive of a magneto-optical recording/reproducing apparatus) including this optical pickup, and more particularly to an optical lens formed of a material having a high refractive index in a wavelength region of visible light, thereby increasing a numerical aperture to make it suitable for a near-field optical recording/reproducing system for performing recording and/or reproduction on an optical recording medium.

An optical recording medium typically including a compact disc (CD), mini disc (MD), and digital video disc (DVD) is widely used as a storage medium for audio information, video information, data, program, and so forth (the term of "optical recording medium" mentioned in this specification is meant to also include a magneto-optical recording medium).

However, higher sound quality, higher image quality, longer operation time, and higher capacity are required in audio information, video information, data, program, and so forth, and it is therefore desired to develop a higher-capacity optical recording medium and an optical recording/reproducing apparatus for performing recording/reproduction on such a higher-capacity optical recording medium (the term of "optical recording/reproducing apparatus" mentioned in this specification is meant to also include a magneto-optical recording/reproducing apparatus).

In a conventional optical recording/reproducing apparatus designed to meet the above requirement, the wavelength of light to be emitted from a light source (e.g., semiconductor laser) is shortened or the numerical aperture of a condenser lens is increased to thereby reduce the diameter of a beam spot formed by convergence of light through the condenser lens.

Concerning the semiconductor laser, a GaN semiconductor laser having an oscillation wavelength of 400 nm band shortened from 635 nm as the oscillation wavelength of a conventional red laser is toward practical use, thereby reducing the diameter of the beam spot.

For shorter oscillation wavelengths, a far-ultraviolet solid-state laser, UW-1010 manufactured by Sony Corporation, capable of continuously oscillating light having a single wavelength of 266 nm is on the market, thus further reducing the diameter of the beam spot. Other examples under research and development include a frequency-doubled laser (266 nm band) from a Nd:YAG laser, a diamond laser (235 nm band), and a frequency-doubled laser (202 nm band) from a GaN laser.

Further, a near-field optical recording/reproducing system is under study, wherein an optical lens having a large numerical aperture such as a solid immersion lens (SIL) typically is used to realize a condenser lens having a numerical aperture of more than 1, and the objective surface of the condenser lens is positioned close to a recording medium with a spacing substantially equal to the wavelength of light from a light source to thereby perform recording/reproduction. Non-patent Literature 1 shown below is a literature on the near-field optical recording/reproducing system using the solid immersion lens.

[Non-patent Literature 1]

I. Ichimura et. al., "Near-Field Phase-Change Optical Recording of 1.36 Numerical Aperture", Jpn. J. Appl. Phys. Vol. 39, 962-967 (2000).

In this near-field optical recording/reproducing system, it is important how the distance between the optical recording medium and the condenser lens is maintained in an optical contact condition. Further, since the diameter of a light beam emitted from the light source and entering the condenser lens is small and the distance between the optical recording medium and the condenser lens is very small, the condenser lens is greatly limited in shape.

Figure 1:
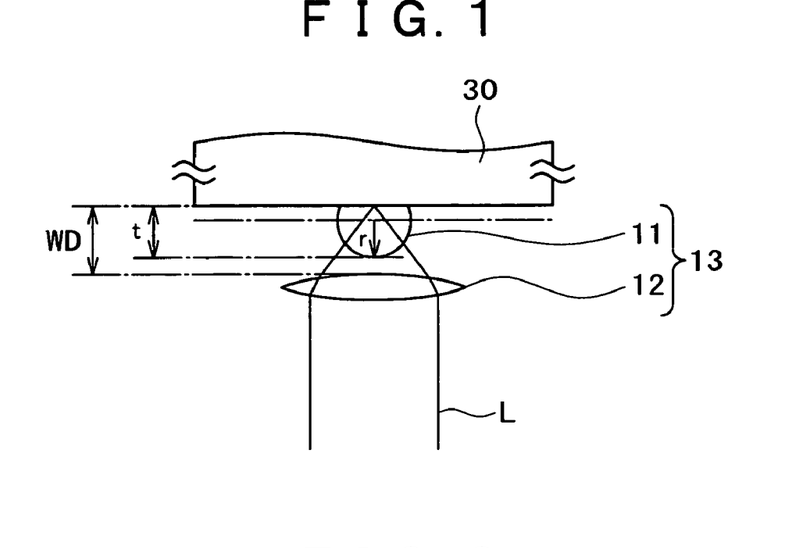
FIG. 1 is a schematic view showing the configuration of an essential part of an optical pickup according to a preferred embodiment of the present invention.

FIG. 1 is a schematic sectional view of an optical system in the case of recording information by using the near-field optical recording/reproducing system. The configuration of the optical system shown in FIG. 1 will be hereinafter described in detail in the description of a preferred embodiment of the present invention. As shown in FIG. 1, a first optical lens 11 is opposed to an optical recording medium 30, and a second optical lens 12 is opposed to the first optical lens 11. In other words, the first and second optical lenses 11 and 12 are arranged in this order from the optical recording medium 30 side. The first optical lens 11 is provided by a super-semispherical optical lens formed of glass ($SiO_2$) having a refractive index of n=1.5 (a specific configuration of the super-semispherical optical lens will be hereinafter described). These optical lenses 11 and 12 constitute a near-field condenser lens 13. In this example, the numerical aperture of the near-field condenser lens 13 is calculated as 1.25 [$=n \times \sin(\tan^{-1} n) = 1.5 \times \sin(\tan^{-1} 1.5)$].

In the first optical lens (super-semispherical optical lens) 11, the relation of $t=r(1+1/n)$ is given where r is the radius of curvature of the optical lens 11, n is the refractive index of the optical lens 11, and t is the thickness of the optical lens 11. Letting WD denote the distance between the second optical lens 12 and the optical recording medium 30 which distance is determined by the numerical aperture of the second optical lens 12, the condition of $t=r(1+1/n)=1.667r<WD$ must be satisfied. Accordingly, in suitably and easily realizing the distance between the first optical lens 11 and the second optical lens 12, it is necessary to minimize the radius of curvature r or to maximize the refractive index n of the optical lens 11.

However, the radius of curvature r of the first optical lens 11 cannot be reduced to less than 1 mm from the viewpoint of the assembly accuracy of an optical pickup including this optical lens. In general, a condenser lens in a near-field optical recording/reproducing system is composed of first and second optical lenses arranged in this order from the side of an optical recording medium, and a numerical aperture of more than 1 for the condenser lens is realized by the combination of these two optical lenses. The assembly accuracy of these two optical lenses is required to become higher with an increase in the numerical aperture, and this accuracy must be maintained against changes in environment. Therefore, if the radius of curvature of the first optical lens is too small, the required assembly accuracy of the near-field condenser lens cannot be realized.

Further, the refractive index of the first optical lens formed of glass ($SiO_2$) is limited to about 1.5 at the maximum, so that the thickness of the first optical lens cannot be reduced below a certain limit.

On the other hand, in realizing a higher density in the near-field optical recording/reproducing system, a beam spot to be formed by the condenser lens must be reduced by shortening the wavelength of light to be emitted from a light source or by increasing the numerical aperture of the condenser lens as in a conventional normal optical recording system. The area of the beam spot is inversely proportional to the square of the numerical aperture of the condenser lens. It is therefore effective to increase the numerical aperture of the condenser lens in realizing a higher density in the near-field optical recording/reproducing system.

For example, in the case that the first optical lens is a super-semispherical optical lens as in FIG. 1, the numerical aperture NA of the near-field condenser lens is given by $NA = n \times \sin(\tan^{-1} n)$ where n is the refractive index of the first optical lens. Conventionally, both the first and second optical lenses are formed of glass ($SiO_2$), so that the refractive index of the first optical lens is limited to 1.5 at the maximum in a wavelength region of visible light. Accordingly, in the case that the first optical lens is a super-semispherical optical lens formed of glass, the maximum numerical aperture NA of the near-field condenser lens is given by $NA = 1.5 \times \sin(\tan^{-1} 1.5) = 1.25$. Accordingly, there is a limit to increasing the density by using the near-field condenser lens formed of glass.

SUMMARY OF THE INVENTION

It is accordingly an object of the present invention to provide an optical lens having a high refractive index and a low light absorption characteristic in a wavelength region of visible light.

It is another object of the present invention to provide a condenser lens suitable for a near-field optical recording/reproducing system by using the above optical lens.

It is still another object of the present invention to provide an optical pickup which can support an increase in density and capacity of an optical recording medium by using the above condenser lens.

It is a further object of the present invention to provide an optical recording/reproducing apparatus including the above optical pickup.

Accordance to the first aspect of the present invention, there is provided an optical lens formed from an SiC single crystal having a cubic structure as an optical material.

Accordance to the second aspect of the present invention, there is provided a condenser lens including a first optical lens and a second optical lens arranged in this order from an objective surface so that the optical axes of the first and second optical lenses are in line with each other;

wherein at least the first optical lens is formed from an SiC single crystal having a cubic structure as an optical material.

Accordance to the third aspect of the present invention, there is provided an optical pickup including a light source and a condenser lens for converging light emitted from the light source to form a beam spot, the condenser lens including a first optical lens and a second optical lens arranged in this order from an objective surface so that the optical axes of the first and second optical lenses are in line with each other;

wherein the first optical lens is formed from an SiC single crystal having a cubic structure as an optical material.

Accordance to the fourth aspect of the present invention, there is provided an optical recording/reproducing apparatus including an optical pickup including a light source and a condenser lens for converging light emitted from the light source to form a beam spot, the condenser lens including a first optical lens and a second optical lens arranged in this order from an objective surface so that the optical axes of the first and second optical lenses are in line with each other; and control drive means for controllably driving the condenser lens in a focusing direction and/or a tracking direction of an optical recording medium;

wherein the first optical lens is formed from an SiC single crystal having a cubic structure as an optical material.

According to the present invention, the SiC single crystal having the cubic structure is used as the optical material forming the optical lens, so that the refractive index of the optical lens can be increased to 2.5 or more as compared with the conventional optical lens formed of glass whose refractive index is limited to about 1.5. Further, the optical lens formed from the SiC single crystal having the cubic structure is superior in light transmissivity (light transmittance) at wavelengths longer than 564 nm, so that the optical efficiency of recording/reproduction to optical power from the light source can be improved.

Further, it is possible to easily obtain a condenser lens having a numerical aperture of 2.0 or more in the wavelength region of visible light by using the optical lens according to the present invention. Further, the diameter of the light beam incident on the second optical lens as one of the components of the condenser lens included in the optical pickup or in the optical recording/reproducing apparatus can be reduced, so that the condenser lens to be controllably driven in the focusing direction and/or the tracking direction of the optical recording medium can be reduced in size and weight. Moreover, servo characteristics such as focusing servo, tracking servo, and seek time can be improved.

Accordingly, it is possible to provide an optical pickup and an optical recording/reproducing apparatus which can support a wavelength of 635 nm, 650 nm, 780 nm, or 830 nm to be realized as the wavelength of light to be emitted from the light source in response to an increase in density and capacity of a future optical recording medium.

According to the optical lens of the present invention, the refractive index in the wavelength region of visible light can be increased to 2.5 or more as compared with the conventional optical lens formed of glass such as $SiO_2$ whose refractive index is limited to about 1.5.

According to the condenser lens of the present invention, the first optical lens and the second optical lens constituting the condenser lens in combination are arranged in this order from the objective surface, and at least the first optical lens is formed from an SiC single crystal having a cubic structure. With this configuration, it is possible to easily obtain a condenser lens which has a numerical aperture of 2.0 or more and is compact and lightweight.

According to the optical pickup of the present invention, the first optical lens as one of the components of the condenser lens included in the optical pickup is formed from an SiC single crystal having a cubic structure, so that it is possible to easily obtain a condenser lens which has a numerical aperture of 2.0 or more and is compact and lightweight. The area of a beam spot formed by the condenser lens can be reduced in inverse proportion to the square of the numerical aperture of the condenser lens. Therefore, it is possible to realize an optical pickup which can allow recording/reproduction on an optical recording medium having a high density about 3.5 times or more than in the case of a glass material. Accordingly, it is possible to provide an optical pickup which can support a wavelength region of 635 nm to 780 nm to be practically used for the light source in response to an increase in density and capacity of a future optical recording medium.

According to the optical recording/reproducing apparatus of the present invention, the first optical lens as one of the components of the condenser lens included in the optical pickup included in the optical recording/reproducing apparatus is formed from an SiC single crystal having a cubic structure, so that the diameter of a light beam incident on the second optical lens can be reduced. As a result, the condenser lens to be controllably driven in the focusing direction and the tracking direction of the optical recording medium can be reduced in size and weight, and servo characteristics such as focusing servo, tracking servo, and seek time can be improved. Accordingly, it is possible to support an increase in density and capacity of an optical recording medium by adopting a near-field recording/reproducing system. Furthermore, it is possible to provide an optical recording/reproducing apparatus including an optical pickup which can support a wavelength region of 635 nm to 780 nm to be practically used for the light source in response to an increase in density and capacity of a future optical recording medium.

Other objects and features of the invention will be more fully understood from the following detailed description and appended claims when taken with the accompanying drawings.

DETAILED DESCRIPTION OF THE PREFERRED EMBODIMENTS

Prior to the description of specific embodiments of the present invention, there will now be described the present invention in summary.

The present invention provides an optical lens formed from an SiC single crystal (silicon carbide single crystal) having a cubic structure as an optical material. The present invention further provides a condenser lens employing an optical lens formed from an SiC single crystal having a cubic structure as an optical material, as at least one component lens. The present invention further provides an optical pickup employing a condenser lens, wherein the condenser lens includes an optical lens formed from an SiC single crystal having a cubic structure as an optical material. The present invention further provides an optical recording/reproducing apparatus including this optical pickup.

It should be noted that the optical recording/reproducing apparatus described in this specification includes not only a recording and reproducing apparatus for recording and reproducing information on an optical recording medium, but also a recording apparatus for only recording information to an optical recording medium and a reproducing apparatus for only reproducing information from an optical recording medium. Further, as already mentioned above, the optical recording medium also includes a magneto-optical recording medium and other recording media for use in optically recording and/or reproducing information.

The crystal structure of the SiC single crystal used as the optical material of the optical lens is cubic in the present invention, which means that this crystal structure has optical isotropy such that the refractive index is constant in all directions regardless of the crystallographic axis. Accordingly, in fabricating the optical lens from the SiC single crystal, this material can be subjected to cutting, working, and polishing without concern for the direction of the crystallographic axis.

Figure 2:
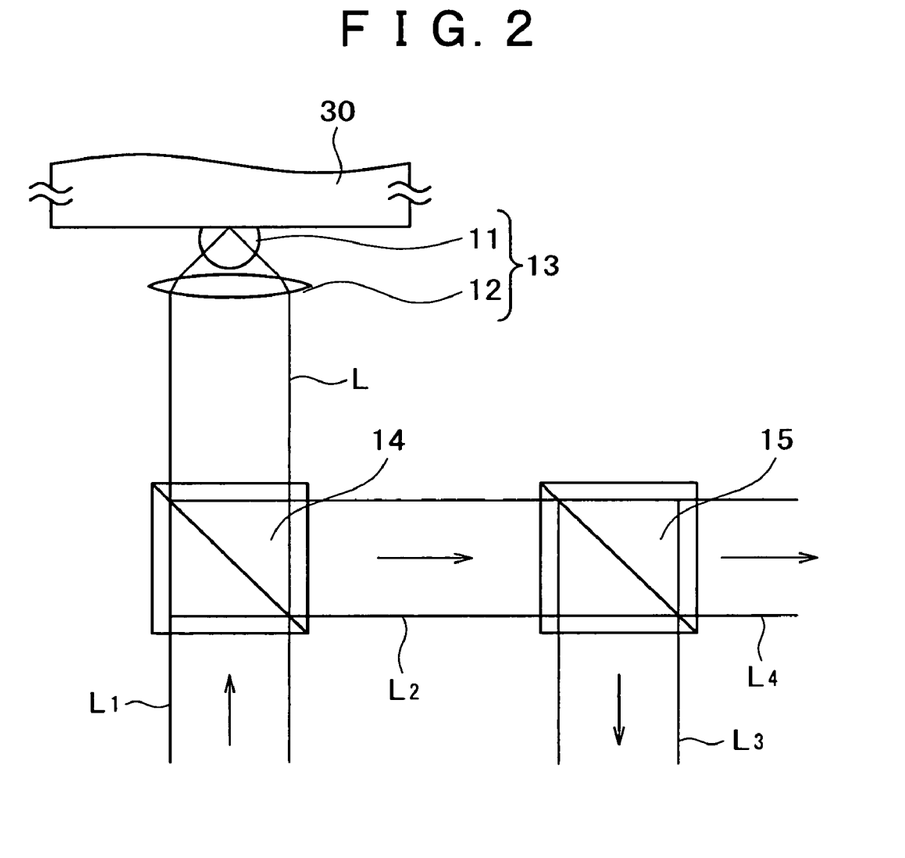
FIG. 2 is a schematic view showing the configuration of an optical system in the optical pickup.

A preferred embodiment of the present invention will now be described with reference to the attached drawings. FIG. 1 is a schematic view showing the configuration of an essential part of an optical pickup including an optical lens formed from an SiC single crystal having a cubic structure as an optical material according to a preferred embodiment of the present invention. FIG. 2 shows an example of the configuration of an optical system constituting the optical pickup shown in FIG. 1.

As shown in FIGS. 1 and 2, the optical pickup includes a light source such as a semiconductor laser (not shown), a condenser lens 13 for converging a light beam L onto a recording medium (optical recording medium or magneto-optical recording medium) 30, a first beam splitter 14 for separating a light beam L1 emitted from the light source and a light beam L2 reflected on the recording medium 30 from each other, and a second beam splitter 15 for separating the light beam L2 into two light beams L3 and L4.

In this example, the light source emits light having wavelengths longer than 564 nm. The reason for use of the light having wavelengths longer than 564 nm is to use the wavelengths at which the transmittance of the SiC single crystal becomes 0.

The condenser lens 13 is composed of a first optical lens 11 and a second optical lens 12 arranged in this order from the recording medium 30 side so that the optical axes of these lenses 11 and 12 are in line with each other. In this example, the first optical lens 11 is provided by a super-semispherical optical lens or a semispherical optical lens. The structures of these lenses will be hereinafter described in detail.

In the case that the recording medium 30 is a disk-shaped recording medium, for example, the recording medium 30 is adapted to be mounted on a spindle motor for rotation at a given speed.

Actually, the first optical lens 11 and the recording medium 30 are not in contact with each other. However, since the spacing between the optical lens 11 and the recording medium 30 is sufficiently smaller than the thickness t of the optical lens 11 (e.g., on the order of $10^{-4}$), the optical lens 11 and the recording medium 30 are shown as if they were in contact with each other in FIGS. 1 and 2. The same applies to the other drawings.

In the optical pickup according to this preferred embodiment, at least the first optical lens 11 facing the recording medium 30 as one of the component lenses 11 and 12 of the condenser lens 13 is provided by an optical lens formed from an SiC single crystal having a cubic structure as an optical material as mentioned above. The material of the second optical lens 12 is not especially limited, but any materials including fluoride optical material, glass, and plastic may be used.

There will now be described optical paths and the operation of each component in the optical pickup shown in FIGS. 1 and 2.

The light emitted from the light source such as a semiconductor laser is converted into parallel light by a collimator lens (not shown). The light beam L1 of this parallel light is transmitted through the first beam splitter 14 and next converged onto the information recording surface of the recording medium 30 by the condenser lens 13. The light reflected on the information recording surface of the recording medium 30 is transmitted again through the condenser lens 13 and next reflected by the first beam splitter 14. The reflected light from the first beam splitter 14 as the light beam L2 enters the second beam splitter 15.

A part of the light beam L2 is reflected by the second beam splitter 15 to obtain the light beam L3, and the remaining part of the light beam L2 is transmitted through the second beam splitter 15 to obtain the light beam L4. The light beam L3 is converged onto a tracking photodetector (not shown) to detect a tracking error signal. The light beam L4 is converged onto a focusing photodetector (not shown) to detect a focusing error signal and a reproduction pit signal.

The optical pickup shown in FIGS. 1 and 2 is provided with means for controllably driving the condenser lens 13 in a tracking direction and a focusing direction. Specific examples of this control drive means include a biaxial actuator used in a general optical pickup and a slider used for a magnetic head or the like.

Figure 3:
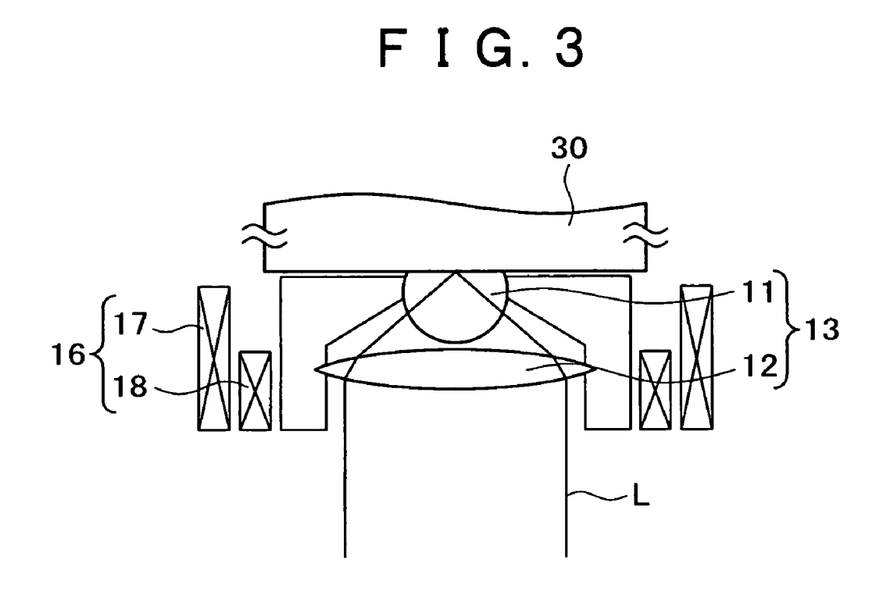
FIG. 3 is a schematic view showing the configuration of a biaxial actuator adopted as control drive means for a condenser lens shown in FIGS. 1 and 2.

Some preferred embodiments of the control drive means for the condenser lens 13 will now be described. FIG. 3 is a schematic view showing the configuration of an optical pickup in the case that a biaxial actuator is adopted as the control drive means for the condenser lens 13 shown in FIGS. 1 and 2. As shown in FIG. 3, the condenser lens 13 (the system of the optical lenses 11 and 12) is fixed to a biaxial actuator 16 composed of a tracking coil 17 for controllably driving the condenser lens 13 in the tracking direction and a focusing coil 18 for controllably driving the condenser lens 13 in the focusing direction.

The biaxial actuator 16 can control the distance between the recording medium 30 and the first control lens 11. For example, by monitoring the quantity of the return light from the recording medium 30 to feedback distance information, the distance between the first optical lens 11 and the recording medium 30 can be maintained constant, and the collision between the first optical lens 11 and the recording medium 30 can be avoided.

Further, by monitoring the quantity of the return light from the recording medium 30 to feedback position information, the tracking coil 17 is driven to move the condenser lens 13 in the tracking direction, thereby moving a beam spot formed on the recording medium 30 to a desired recording track.

Figure 4:
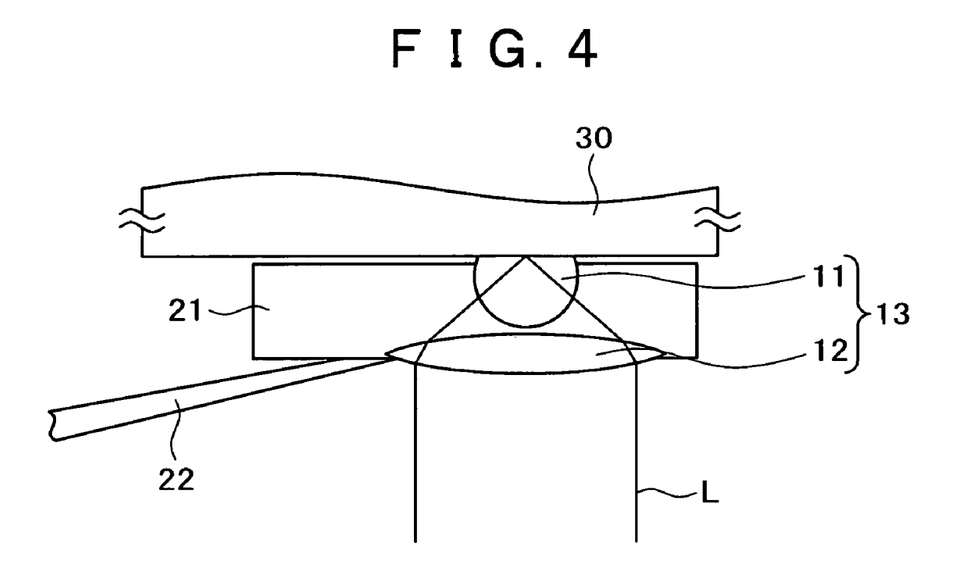
FIG. 4 is a schematic view showing the configuration of a slider adopted as the control drive means for the condenser lens.

FIG. 4 is a schematic view showing the configuration of an optical pickup in the case that a slider is adopted as the control drive means for the condenser lens 13 shown in FIGS. 1 and 2.

As shown in FIG. 4, the condenser lens 13 (the system of the optical lenses 11 and 12) is fixed to a slider 21 adapted to be controllably driven in the tracking direction. The slider 21 is supported through an elastic member such as a gimbal 22 having elasticity in only a direction perpendicular to the information recording surface of the recording medium 30 to a movable optical portion (not shown) movable in the tracking direction. The movable optical portion is controllably driven in the tracking direction by control drive means such as a linear motor.

When the recording medium 30 is rotated, a gas flow is generated in the rotational direction of the recording medium 30 and it is introduced between the recording medium 30 and the slider 21, thereby forming a thin film of gas balancing with the elastic force of the gimbal 22 for urging the slider 21 toward the recording medium 30. Accordingly, the slider 21 is kept flying from the recording medium 30 at a given height therefrom, e.g., 50 nm.

That is, during rotation of the recording medium 30 at a given speed in reproduction of information from the recording medium 30 or in recording of information to the recording medium 30, the distance between the recording medium 30 and the first optical lens 11 as one of the components of the condenser lens 13 is maintained substantially constant by the slider 21.

As required, the optical pickup may further include means for correcting a remaining focus error component left after followed by the biaxial actuator 16 or the slider 21 to which the condenser lens 13 is fixed, in response to surface vibrations of the recording medium 30, and also correcting an error component occurred in assembling the condenser lens 13 (the system of the optical lenses 11 and 12). Such correcting means may be provided by a relay lens inserted between the first beam splitter 14 and the second optical lens 12. The relay lens can make the correction by changing the spacing between the optical lenses 11 and 12.

In the case that the first and second optical lenses 11 and 12 are fixed to the slider 21 as shown in FIG. 4, the correcting means for correcting a remaining focus error component left after followed by the slider 21 and also correcting an error component occurred in assembling the condenser lens 13 may be provided. The correcting means may be configured by fixing the first optical lens 11 to the slider 21 and making the second optical lens 12 movable relative to the first optical lens 11 along the optical axis by means of a piezoelectric element, for example.

Figure 5:
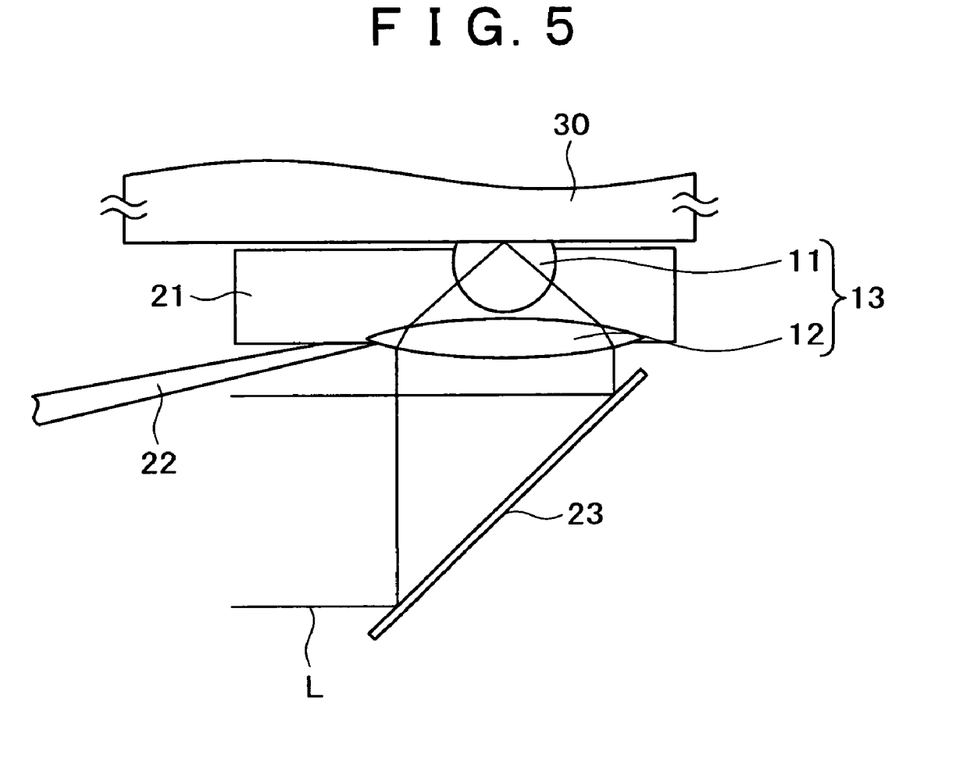
FIG. 5 is a schematic view showing the configuration of a mirror added to the slider shown in FIG. 4.

Further, in the case of an optical recording/reproducing apparatus having a spindle motor on which a plurality of optical recording media are mounted (a structure similar to that having a plurality of stacked recording media adopted in a magnetic recording/reproducing apparatus such as a hard disk drive), the slider 21 is preferably provided with a mirror 23 for bending the optical axis about 90 degrees as shown in FIG. 5. With this configuration, the spacing between the adjacent optical recording media in the optical recording/reproducing apparatus can be reduced, so that the optical recording/reproducing apparatus can be reduced in size or thickness.

Specific shapes of the first optical lens 11 will now be described with reference to FIGS. 6 and 7.

Figure 6:
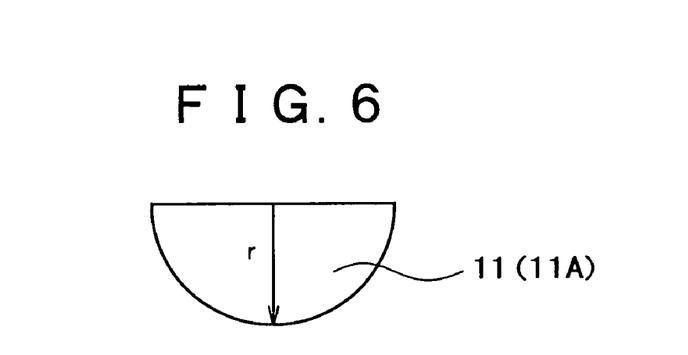
FIGS. 6 to 11 are schematic views illustrating various shapes of a first optical lens as one of the components of the condenser lens.

FIG. 6 shows a case where a semispherical optical lens 11A is adopted as the first optical lens 11. In this case, the thickness of the lens 11A is equal to the radius of curvature r thereof.

Figure 7:
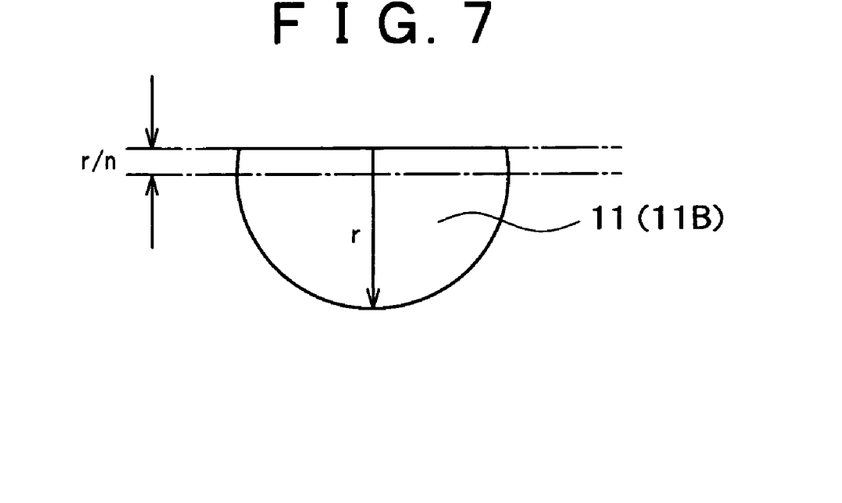

FIG. 7 shows a case where a super-semispherical optical lens 11B is adopted as the first optical lens 11. The super-semispherical optical lens 11B is provided by adding a part of the upper semisphere by a thickness of r/n to the lower semisphere. Accordingly, the thickness of the lens 11B is equal to $r(1+1/n)$.

In each of the cases of FIGS. 6 and 7, the first optical lens 11 has a flat objective surface opposed to the recording medium 30 and a convex spherical surface opposite to the objective surface. The convex spherical surface of the first optical lens 11 is fixed to the biaxial actuator 16 or the slider 21.

Figure 8:
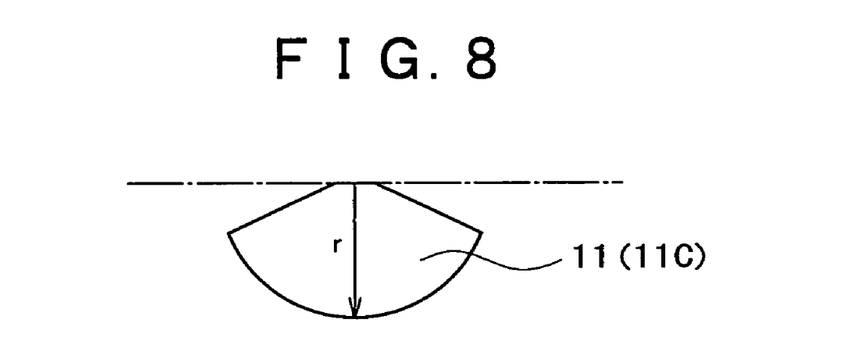

FIG. 8 shows a case where an optical lens 11C modified from the semispherical optical lens 11A shown in FIG. 6 is adopted as the first optical lens 11. The optical lens 11C has a conical objective surface formed by working the flat objective surface of the semispherical optical lens 11A.

Figure 9:
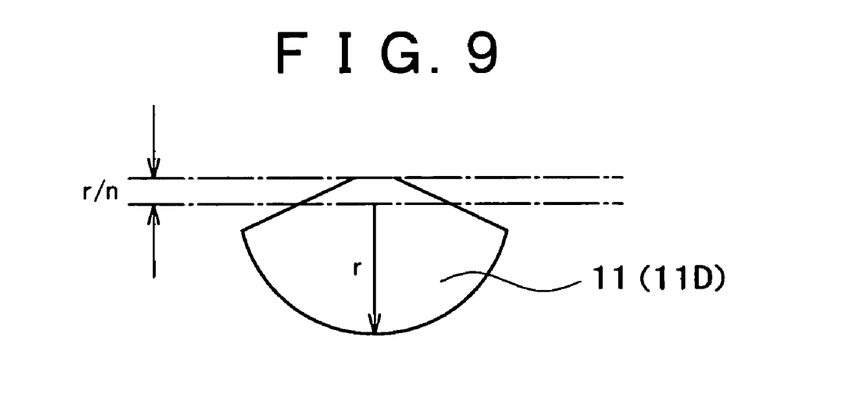

FIG. 9 shows a case where an optical lens 11D modified from the super-semispherical optical lens 11B shown in FIG. 7 is adopted as the first optical lens 11. The optical lens 11D has a conical objective surface formed by working the flat objective surface of the super-semispherical optical lens 11B.

In the near-field optical recording/reproducing system, the distance between the recording medium 30 and the first optical lens 11 is as very small as tens of nanometers. Accordingly, by working the objective surface of the first optical lens 11 into a conical surface as shown in FIGS. 8 and 9, the tolerance to inclination of the recording medium 30 or the first optical lens 11 can be increased.

In the case that a magneto-optical recording medium is used as the recording medium 30 in the near-field optical recording/reproducing system, a magnetic field is required in recording and/or reproducing information. In this case, magnetic field applying means such as a magnetic coil 25 may be mounted on a part of the objective surface of the first optical lens 11 as shown in FIG. 10 or 11.

Figure 10:
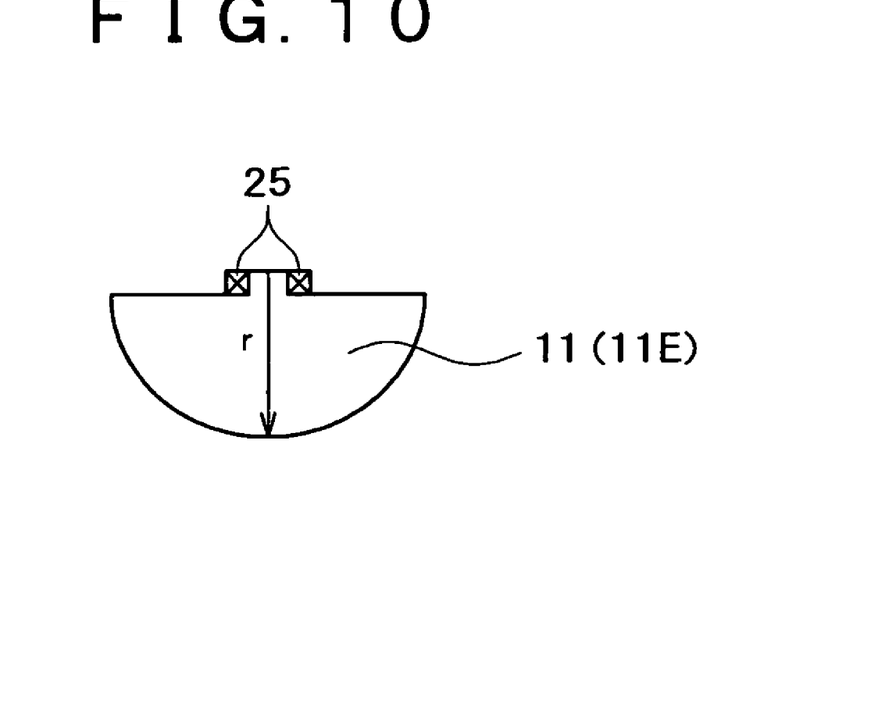

FIG. 10 shows a case where a semispherical optical lens 11E having a stepped objective surface is adopted as the first optical lens 11. The stepped objective surface of the semispherical optical lens 11E is formed by working the flat objective surface of the semispherical optical lens 11A into a flat stepped surface except a central portion. The magnetic coil 25 is mounted on the flat stepped surface around the central portion.

Figure 11:
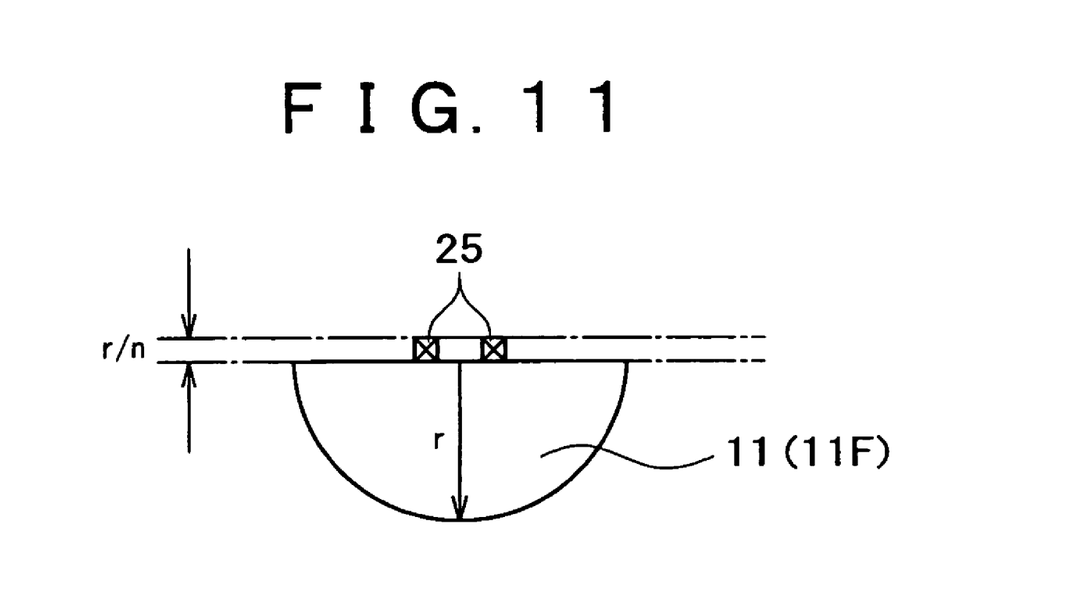

FIG. 11 shows a case where a super-semispherical optical lens 11F having a stepped objective surface is adopted as the first optical lens 11. The stepped objective surface of the super-semispherical optical lens 11F is formed by working the flat objective surface of the super-semispherical optical lens 11B into a flat stepped surface except a central portion. The magnetic coil 25 is mounted on the flat stepped surface around the central portion.

In each of the cases of FIGS. 10 and 11, the height of the magnetic coil 25 is set substantially equal to the height of the central portion. With this configuration, the optical lens 11 can be positioned close to the recording surface of the magneto-optical recording medium and a magnetic field can be applied well by the magnetic coil 25.

There will now be described the characteristics of the lens using an SiC single crystal having a cubic structure as an optical material as mentioned above. This optical material is a single crystal, which excludes a grain boundary as in a polycrystalline material and a stria as in a glass material. As a result, incident light does not incur scattering and absorption, so that the SiC single crystal is suitable for an optical lens material.

Further, the SiC single crystal has a cubic structure as in Si, and it is an Si-based material. Accordingly, the SiC single crystal has a high affinity for a manufacturing process for a semiconductor apparatus, and an etching process or polishing process for fabrication of the optical lens can be easily applied.

The SiC single crystal having the cubic structure as the optical lens material has a higher refractive index as compared with a conventional glass material in a wavelength region of 564 nm to 1000 nm. For example, this optical lens material has a refractive index of more than 2.5 in a wavelength region of 635 nm to 780 nm as the oscillation wavelength of a red semiconductor laser. Accordingly, the use of a red semiconductor laser as the light source and an optical lens formed from an SiC single crystal having a cubic structure is very effective in increasing the numerical aperture of a condenser lens for an optical recording/reproducing system, thereby contributing to an increase in density and capacity of an optical recording medium.

Further, by selecting the cubic structure as the crystal structure of the SiC single crystal, the optical lens formed from the SiC single crystal is made to have optical isotropy such that the refractive index is constant regardless of the crystallographic axis. For example, in forming a spherical optical lens as a step of the process of fabricating the first optical lens, this optical lens material can be subjected to cutting, working, and polishing without concern for the direction of the crystallographic axis. Accordingly, this material can be worked at a cost substantially equal to that of a glass material.

Further, the SiC single crystal having the cubic structure as the optical lens material may be manufactured by heteroepitaxial growth on an Si substrate in vapor phase deposition. Since this lens material has a high refractive index, the optical lens using this lens material can be reduced in size or thickness as mentioned above, and it can be mounted in an optical pickup or an optical recording/reproducing apparatus at a relatively low cost.

Further, the absorption coefficient of the SiC single crystal having the cubic structure as the optical lens material can be controlled to 1 cm$^{-1}$ or less in a wavelength region of 564 nm to 1000 nm where the refractive index increases, by controlling and optimizing a defect concentration or an impurity concentration. By controlling the absorption coefficient to preferably 0.1 cm$^{-1}$ or less, the transmittance of the first optical lens 11 can be increased to 95% or more even when the thickness of the lens 11 is 5 mm.

The optical lens formed from the SiC single crystal having the cubic structure as Example 1 according to the present invention will now be compared with an optical lens formed from an SiO$_2$ glass material as Comparative Example 1.

Figure 12A:
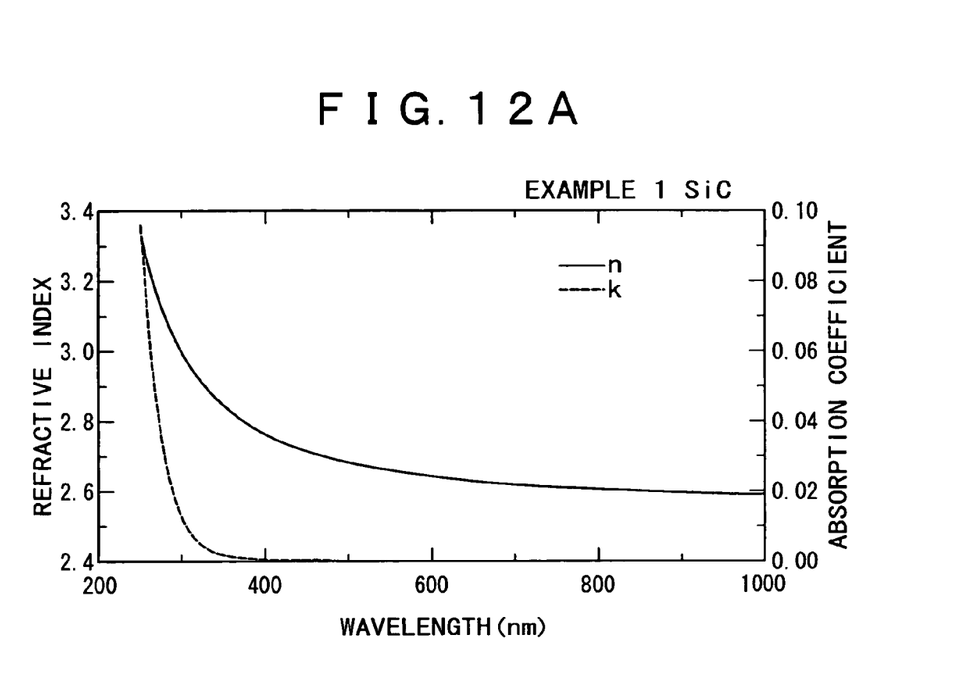
FIG. 12A is a graph showing the wavelength dependence of refractive index of SiC as the material of the first optical lens according to the present invention.
Figure 12B:
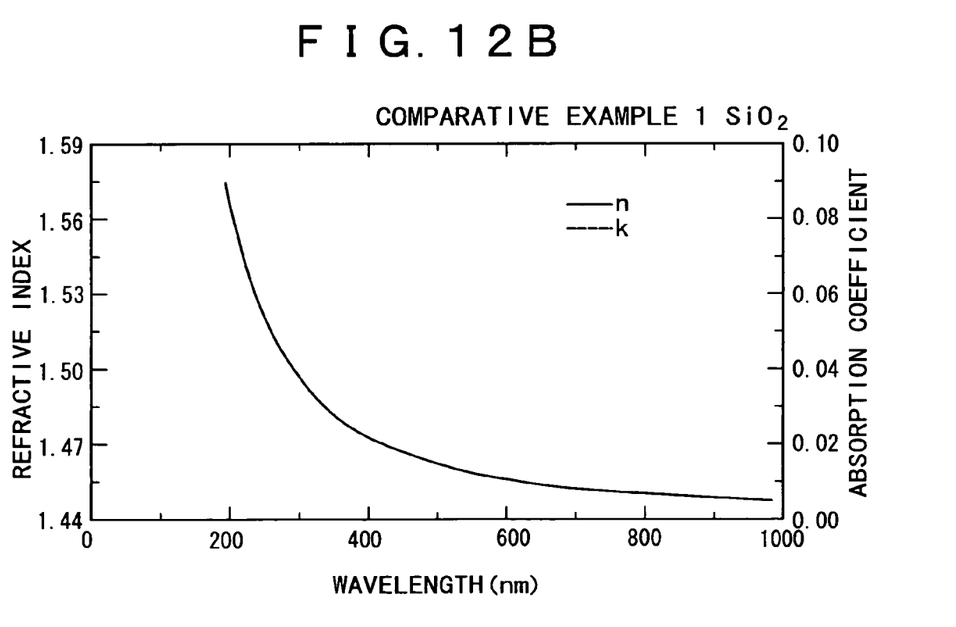
FIG. 12B is a graph showing the wavelength dependence of refractive index of $SiO_2$ as the material of the first optical lens in the prior art.

FIGS. 12A and 12B are graphs showing the wavelength dependence of refractive index and absorption coefficient in a wavelength region of 564 nm to 1000 nm as tested on a sample of the SiC single crystal (Example 1, FIG. 12A) and a sample of the SiO$_2$ glass material (Comparative Example 1, FIG. 12B), respectively. It should be noted that the numerals indicating the refractive index along the vertical axis in FIG. 12A are different from those shown in FIG. 12B.

The SiC single crystal according to Example 1 has a refractive index of more than 2.5 over the wavelength range of 564 nm to 1000 nm. On the other hand, the SiO$_2$ glass material according to Comparative Example 1 has a refractive index of about 1.5 over the wavelength range of 564 nm to 1000 nm. Further, the SiC single crystal according to Example 1 has an absorption coefficient of 0.1 cm$^{-1}$ or less over the wavelength range from 600 nm to longer wavelengths. This result indicates that the SiC single crystal is superior in light transmissivity (light transmittance) and that the optical efficiency of recording/reproduction to optical power from the light source can be improved.

Table 1 shows the refractive indices of the samples of Example 1 and Comparative Example 1 at 650 nm as the oscillation wavelength of a red semiconductor laser, and further shows the numerical apertures of condenser lenses configured as shown in FIG. 1 by using the materials of Example 1 and Comparative Example 1 for the first optical lens 11.

TABLE 1

| Sample | Refractive index at 650 nm | Numerical aperture of condenser lens |
|---|---|---|
| Example 1, SiC | 2.64 | 2.47 |
| Comparative Example 1, SiO$_2$ | 1.50 | 1.25 |

As apparent from Table 1, the refractive index of the SiC single crystal is larger than that of the SiO$_2$ glass material, and the numerical aperture of the condenser lens prepared by using the SiC single crystal is larger than that of the condenser lens prepared by using the SiO$_2$ glass material.

The area of a beam spot formed by the condenser lens can be reduced in inverse proportion to the square of the numerical aperture of the condenser lens. Therefore, the SiC single crystal can realize an optical pickup allowing recording/reproduction on an optical recording medium having a high density about 3.9 times that in the case of the SiO$_2$ glass material.

Table 2 shows the refractive indices of the samples of Example 1 and Comparative Example 1 at 780 nm as the oscillation wavelength of a red semiconductor laser, and further shows the numerical apertures of condenser lenses configured as shown in FIG. 1 by using the materials of Example 1 and Comparative Example 1 for the first optical lens 11.

TABLE 2

| Sample | Refractive index at 780 nm | Numerical aperture of condenser lens |
|---|---|---|
| Example 1, SiC | 2.62 | 2.45 |
| Comparative Example 1, SiO$_2$ | 1.50 | 1.25 |

As apparent from Table 2, the refractive index of the SiC single crystal is larger than that of the SiO$_2$ glass material, and the numerical aperture of the condenser lens prepared by using the SiC single crystal is larger than that of the condenser lens prepared by using the SiO$_2$ glass material.

The area of a beam spot formed by the condenser lens can be reduced in inverse proportion to the square of the numerical aperture of the condenser lens. Therefore, the SiC single crystal can realize an optical pickup allowing recording/reproduction on an optical recording medium having a high density about 3.8 times that in the case of the Sio$_2$ glass material, by setting the wavelength of light to be emitted from the light source in the optical recording/reproducing apparatus to 780 nm as the oscillation wavelength of a red semiconductor laser.

There will now be described a specific configuration of the condenser lens using the SiC single crystal having the cubic structure with reference to FIG. 1. In this specific configuration, both the first optical lens 11 and the second optical lens 12 are formed from the SiC single crystal having a refractive index of 2.64 at 650 nm. As shown in FIG. 1, the first and second optical lenses 11 and 12 are arranged in this order from the recording medium 30 side to configure the condenser lens having a numerical aperture of 2.47 by a super-semispherical solid immersion lens. By using this condenser lens, near-field recording/reproduction is performed with the distance between the first optical lens 11 and the optical recording medium 30 being maintained at 40 nm, for example.

As mentioned above with reference to FIG. 1, the radius of curvature of the convex spherical surface of the first optical lens 11 is determined by the numerical aperture of the second optical lens 12. Letting WD denote the distance between the second optical lens 12 and the optical recording medium 30, t denote the thickness of the first optical lens 11, and r denote the radius of curvature of the convex spherical surface of the first optical lens 11, the condition of $t=r(1+1/n)=1.405r<WD$ must be satisfied. As compared with the conventional optical lens formed from an SiO$_2$ glass material having a refractive index of 1.50, the values of (1+1/n) for the SiC single crystal and the SiO$_2$ glass material are 1.405 and 1.667, respectively, as shown in Table 3. Since the refractive index of the SiC single crystal is larger than that of the SiO$_2$ glass material, the thickness of the first optical lens 11 can be reduced about 19%. Accordingly, super-semispherical near-field recording/reproduction can be realized with the thickness of the first optical lens 11 made close to that of a semispherical lens. Further, the distance WD between the second optical lens 12 and the optical recording medium 30 can be sufficiently ensured and the diameter of the light beam L incident on the second optical lens 12 can be easily reduced.

TABLE 3

| Sample | Refractive index at 650 nm | Value of (1 + 1/n) |
|---|---|---|
| Example 1, SiC | 2.64 | 1.405 |
| Comparative Example 1, SiO$_2$ | 1.50 | 1.667 |

Further, the weight of the condenser lens to be controllably driven in the focusing direction and the tracking direction in relation to the optical recording medium can be reduced, and servo characteristics such as focusing servo, tracking servo, and seek time can be improved. Further, the optical pickup and the optical recording/reproducing apparatus can be reduced in size or thickness.

The present invention is not limited to the above preferred embodiments, but various modifications may be made without departing from the scope of the present invention. For example, while the SiC single crystal having the cubic structure as the optical material is applied to the first optical lens located close to the recording medium as one of the components of the condenser lens for the near-field recording/reproducing system, this optical material may be applied also to the second optical lens if the manufacture is possible, or may be applied also to the other optical lenses.

Further, the wavelength of light to be emitted from the light source applied to the above-mentioned optical system is not limited to the values shown above in the preferred embodiments. For example, 635 nm, 650 nm, 780 nm, or 830 nm is applicable as the wavelength of light to be emitted from the light source.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An optical lens comprising:
   an optical material comprising a SiC single crystal having a cubic structure;
   a conical objective surface; and
   a convex spherical surface formed opposite said conical objective surface,
   wherein the center of an uppermost portion of the optical lens does not extend beyond a radius of the convex spherical surface from the center of a lowermost portion of the optical lens.

2. A condenser lens comprising:
   a first optical lens comprising an optical material comprising a SiC single crystal having a cubic structure; and
   a second optical lens positioned between said first optical lens and an objective surface so that the optical axes of said first and second optical lenses are in line with each others,
   wherein said first optical lens further comprises a conical objective surface and a convex spherical surface formed opposite said conical objective surface, and
   wherein the center of an uppermost portion of the optical lens does not extend beyond a radius of the convex spherical surface from the center of a lowermost portion of the optical lens.

3. An optical pickup comprising:
   a light source; and
   a condenser lens configured to converge light emitted from said light source to form a beam spot, said condenser lens comprising a first optical lens and a second optical lens positioned between said first optical lens and an objective surface so that the optical axes of said first and second optical lenses are in line with each other,
   wherein said first optical lens comprises an optical material comprising a SiC single crystal having a cubic structure, a conical objective surface, and a convex spherical surface formed opposite said conical objective surface, and
   wherein the center of an uppermost portion of the optical lens does not extend beyond a radius of the convex spherical surface from the center of a lowermost portion of the optical lens.

4. An optical pickup according to claim 3, wherein the wavelength of said light emitted from said light source is longer than 564 nm.

5. An optical pickup according to claim 3, wherein said light source comprises a semiconductor laser.

6. An optical recording/reproducing apparatus comprising:
   an optical pickup including a light source and a condenser lens configured to converge light emitted from said light source to form a beam spot, said condenser lens including a first optical lens and a second optical lens positioned between said first optical lens and an objective surface so that the optical axes of said first and second optical lenses are in line with each other; and
   control drive means for controllably driving said condenser lens in a focusing direction and/or a tracking direction of an optical recording medium,
   wherein said first optical lens comprises an optical material comprising a SiC single crystal having a cubic structure, a conical objective surface, and a convex spherical surface formed opposite said conical objective surface, and
   wherein the center of an uppermost portion of the optical lens does not extend beyond a radius of the convex spherical surface from the center of a lowermost portion of the optical lens.

7. An optical recording/reproducing apparatus according to claim 6, wherein the wavelength of said light emitted from said light source is longer than 564 nm.

8. An optical recording/reproducing apparatus according to claim 6, wherein said light source composes a semiconductor laser.

9. An optical recording/reproducing apparatus according to claim 6, wherein the light beam of said light emitted from said light source has an optical axis substantially parallel to the principal surface of said optical recording medium.

10. An optical recording/reproducing apparatus according to claim 6, further comprising:
    means for mounting a plurality of optical recording media spaced from each other, wherein the spacing between adjacent ones of said optical recording media is larger than the diameter of the light beam of said light emitted from said light source.

* * * * *